United States Patent [19]
Veser et al.

[11] Patent Number: 6,108,865
[45] Date of Patent: Aug. 29, 2000

[54] PORTABLE HANDHELD BLOWER/VACUUM APPARATUS

[75] Inventors: Norbert Veser, Friedrichshafen; Thomas Schweigert, Kernen; Josef Karner, Waiblingen; Helmut Hiltwein, Markgröningen; Peter Bauer, Winnenden, all of Germany

[73] Assignee: Andreas Stihl AG & Co., Waiblingen, Germany

[21] Appl. No.: 09/358,476

[22] Filed: Jul. 21, 1999

[30] Foreign Application Priority Data

Jul. 28, 1998 [DE] Germany .......................... 198 33 837

[51] Int. Cl.$^7$ ...................................................... A47L 9/02
[52] U.S. Cl. .............................. 15/414; 15/344; 15/415.1; 285/7; 285/87; 285/402
[58] Field of Search .................................... 15/327.5, 344, 15/414, 415.1, 405; 285/7, 87, 88, 361, 396, 402

[56] References Cited

U.S. PATENT DOCUMENTS

| | | | |
|---|---|---|---|
| 3,455,580 | 7/1969 | Howard | 285/87 |
| 5,222,275 | 6/1993 | Baker et al. | 15/405 |
| 5,245,726 | 9/1993 | Rote et al. | 15/405 |
| 5,584,436 | 12/1996 | Sepke | 15/414 |
| 5,638,574 | 6/1997 | Haupt et al. | 15/405 |
| 5,926,910 | 7/1999 | Nishimura et al. | 15/415.1 |

*Primary Examiner*—Theresa T. Snider
*Attorney, Agent, or Firm*—Walter Ottesen

[57] ABSTRACT

The invention relates to a portable handheld blower/vacuum apparatus having a housing and a blower scroll formed in the housing. An impeller is provided in the blower scroll. Air is supplied to the blower scroll via an air inlet and air is directed away from the blower scroll via an air outlet. An air-conducting connecting tube is mounted on the air outlet via a housing-fixed connecting stub. A bayonet connection is provided in the overlap region between the connecting tube and the connecting stub. The bayonet connection includes a guide path lying in the overlap region. The guide path includes an axial segment and a peripheral segment connected thereto in which a radial cam of the other part engages. The cam is secured form tight by a latch connection in the peripheral segment of the guide path to ensure a reliable, mechanically loadable attachment of the connecting tube in the connecting stub.

15 Claims, 3 Drawing Sheets

PORTABLE HANDHELD BLOWER/VACUUM APPARATUS

BACKGROUND OF THE INVENTION

U.S. Pat. No. 4,870,714 discloses a portable handheld blower/vacuum apparatus having a housing wherein a blower scroll is formed. An impeller driven by a drive motor is accommodated in the blower scroll. When the drive motor is operating, air is supplied to the blower scroll via an air inlet and is discharged from the blower scroll via an air outlet. An air-conducting connecting tube can be mounted in a connecting stub fixed to the housing in the air inlet as well as in the air outlet. The mounted connecting tube and the housing-fixed connecting stub engage one over the other over a pregiven axial length. A bayonet connection is provided in the overlapping region and includes a guide path and a radial cam provided on the connecting tube. The guide path is configured in the surface of the connecting stub. The connecting tube is axially secured by the bayonet connection.

A blower tube is attached to the connecting stub of the air outlet during blower operation. The air inlet is then covered with an inlet screen. In vacuum operation, a vacuum tube is mounted on the connecting stub of the air inlet while a debris collecting bag is connected to the air outlet for the debris drawn in by suction.

During vacuum operation as well as during blower operation, contact of the free end of the vacuum tube or blower tube with the ground is unavoidable whereby considerable forces become effective at the connecting region because of the long lever. This can lead to an unintended loosening of the bayonet connection and cause the connecting tube to drop off. In this way, operation of the apparatus is negatively affected.

U.S. Pat. No. 5,560,078 discloses a portable handheld blower/vacuum apparatus wherein an oval-shaped blower tube is pushed onto the connecting stub at the air outlet of the blower scroll. A latch mechanism is formed outside of the overlapping region and comprises latch tongues arranged on the blower tube which engage over correspondingly configured latch elements on the connecting tube. Mechanical loading applied to the vacuum tube tip operates directly on the latch connection which therefore has to be configured so that corresponding loads can be applied thereto. Nonetheless, damage because of overload cannot be avoided whereby an inadequate attachment of the blower tube to the connecting stub can occur.

SUMMARY OF THE INVENTION

It is an object of the invention to provide a blower/vacuum apparatus of the kind described above which is improved so that a reliable and mechanically loadable attachment of a connecting tube is ensured.

The portable handheld blower/vacuum apparatus of the invention has a drive motor and a fan wheel driven by the drive motor. The apparatus includes: a housing for accommodating the motor and the fan wheel; the housing including a fan scroll and having an air inlet for conducting air to the fan scroll and an air outlet for directing air out of the fan scroll; an extension tube; the housing further including a mounting stub fixed to the housing; the mounting stub defining a longitudinal axis and communicating with the air outlet; a bayonet connection for facilitating the connection and disconnection of the extension tube to the mounting stub; the mounting stub and the extension tube conjointly defining an overlap region wherein the mounting stub and the extension tube mutually engagingly overlap when the extension tube is connected to the mounting stub and the overlap region having a predetermined axial length (U); the bayonet connection being disposed in the overlap region for axially securing the extension tube on the mounting stub; the bayonet connection including a guide path in the overlap region on one of the mounting stub and the extension tube; the guide path including an axial segment and a peripheral segment connected to the axial segment; the bayonet connection further including: a radial cam on the other one of the mounting stub and the extension tube for slidingly engaging the guide path when the mounting stub and the extension tube are connected to each other; and, a locking latch device for form-tight latching the radial cam in the peripheral segment; the latch device including a latch tongue on the one of the mounting stub and the extension tube for contacting with the radial cam; and, the one of the mounting tube and the extension tube having a window formed in the wall thereof and the latch tongue being disposed in the window and extending in the peripheral direction.

The latch cam of the bayonet connection is secured form-tight in the peripheral segment of the guide path by a latch connection so that the latch device only has to take up rotational forces in the peripheral direction. The lever forces, which occur because of floor contact of the blower tube or vacuum tube, are taken up exclusively by the bayonet connection without the problem of the bayonet connection becoming loose because of the occurring forces. In this way, a mechanically loadable reliable connection is provided between a connecting tube and the connecting stub. A disassembly of the connecting tube is possible by a simple unlatching of the latch connection.

In an advantageous embodiment of the invention, the connecting tube is inserted into the connecting stub and is thereby engagingly grasped by the connecting stub. The connecting stub is advantageously formed as one piece with the housing of the blower/vacuum apparatus. The connecting stub is made of injection-molded plastic of high strength; whereas, the blower/vacuum tube can be made of blown plastic in a simple manufacturing process. The overlapping region and the cylindrical tube form of the connecting tube provide a mechanical connection between a blown plastic part and a form-pressed plastic part which can sustain high loads. The accommodation of the blown plastic-manufactured blower tube on the outer diameter makes it possible to realize significantly lower tolerances and this provides for greater fitting accuracy and handling comfort.

The latch connection comprises a latch tongue contacting with the radial cam of the bayonet connection. The latch tongue preferably extends in the peripheral direction of the connecting stub. The latch tongue is formed as one piece on the connecting stub and lies in a window in the surface of the stub.

The guide path of the bayonet connection is not configured as a simple slot; instead, the guide path is configured as a U-shaped channel when viewed in cross section and the opening of the channel faces toward the inserted section of the connecting tube. The latch tongue is configured in the channel base and extends approximately tangentially to the outer diameter of the inserted tube section.

The latch tongue is covered by a hood essentially over the length of the tongue measured in the peripheral direction. In this way, an unintended loosening of the latch connection is avoided. The hood has a narrow access opening for an insert workpiece such as a screwdriver or the like in the region of the free end of the latch tongue. This ensures that the user sets the blower/vacuum apparatus down for loosening the connecting tube in order to unlatch the latch device with one hand and to rotate with the other hand the connection tube out of the peripheral segment of the guide path for disassembly.

Two bayonet connections lying approximately diametrically opposite each other are advantageously provided in the overlap region. The bayonet connections have radial cams of different size and/or configuration. The one cam is rectangularly shaped when viewed in plan and the other cam is circular in shape when viewed in plan and the guide paths are correspondingly adapted. The rectangularly-shaped cam operates together with the latch connection in the one bayonet connection; whereas, the other cam only serves to guide and axially secure the connecting tube.

A substantially play-free connection between the formed connecting stub and the blown connecting tube is ensured notwithstanding possible occurring greater tolerances. To achieve this, at least one slit, which opens to the connecting end, is provided in the partition plane of the connecting stub which is assembled of two half shells. Attachment domes are provided at the opposite-lying longitudinal edges of the slit at the region of the open end. The attachment domes accommodate clamping screws which extend transversely to the slit. In this way, a diameter reduction and therefore a precisely fitting match of the connecting stub to the diameter of the blown connecting tube is possible by tightening the clamping screws.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
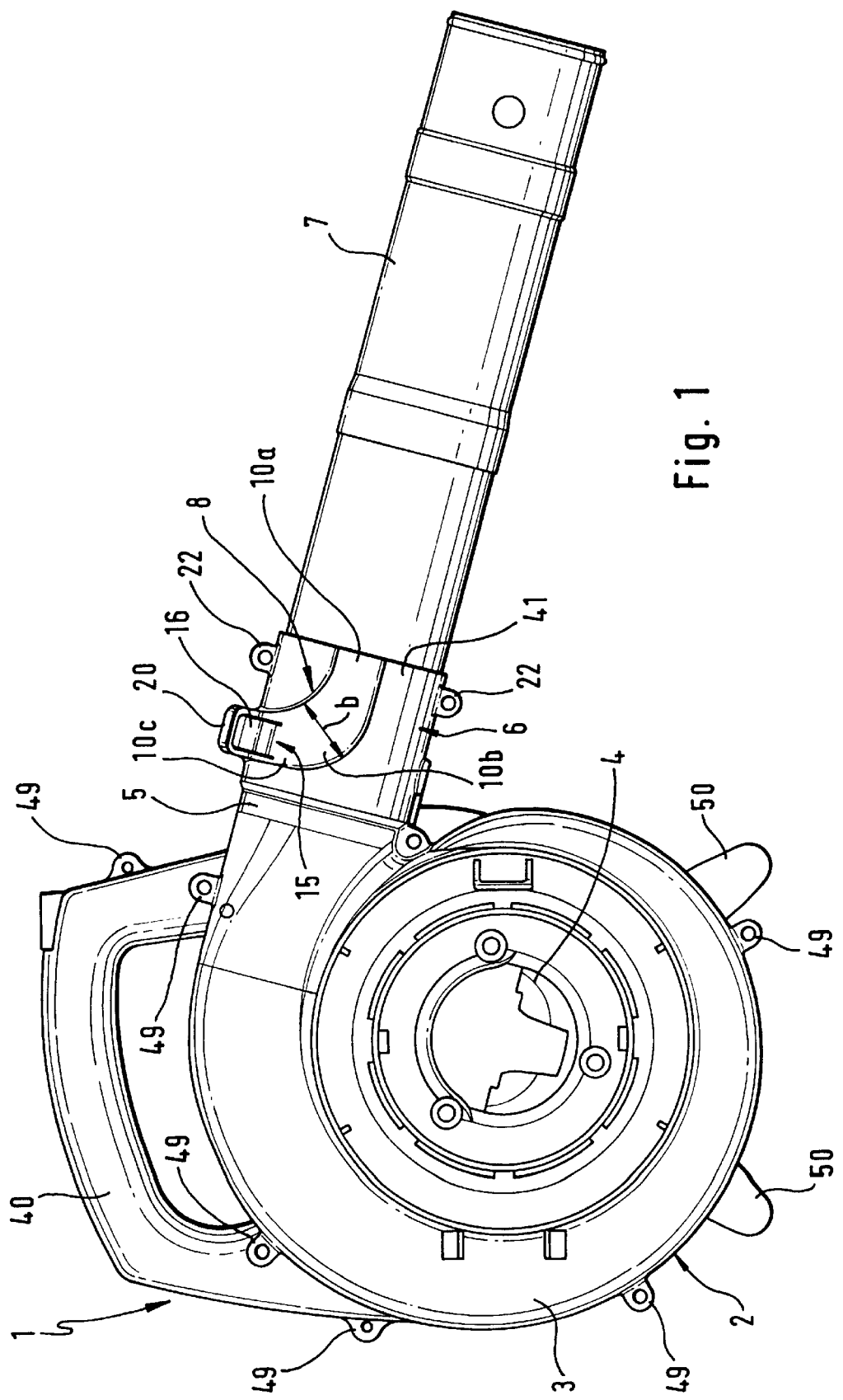
FIG. 1 is a side elevation view of a portable handheld blower/vacuum apparatus of the invention with a blower tube mounted on the connecting stub of the air outlet.

The portable handheld blower/vacuum apparatus 1 shown in FIG. 1 includes a blower scroll 3 formed in a housing 2. An impeller (not shown) is rotatably driven by a drive motor mounted in the housing 2. An air inlet 4 is mounted in the housing 2 and guides air to the blower scroll 3 and lies axially to the blower scroll. Furthermore, an air outlet 5 is provided which leads air out of the blower scroll 3 and is connected approximately tangential to the blower scroll 3. A housing-fixed connecting stub 6 is formed on the air outlet 5 and a connecting tube 7 is inserted into the connecting stub 6. In the embodiment shown, the connecting tube 7 is a blower tube.

The housing of the apparatus 1 has an upper carrying handle 40 which extends in the longitudinal direction in a plane parallel to the connecting stub 6. The housing also includes feet 50 arranged in the base region so that the apparatus 1 can be put down. The housing 2 is assembled of two component shells which are assembled via edge-mounted attachment lugs 49 with clamping screws.

Figure 3:
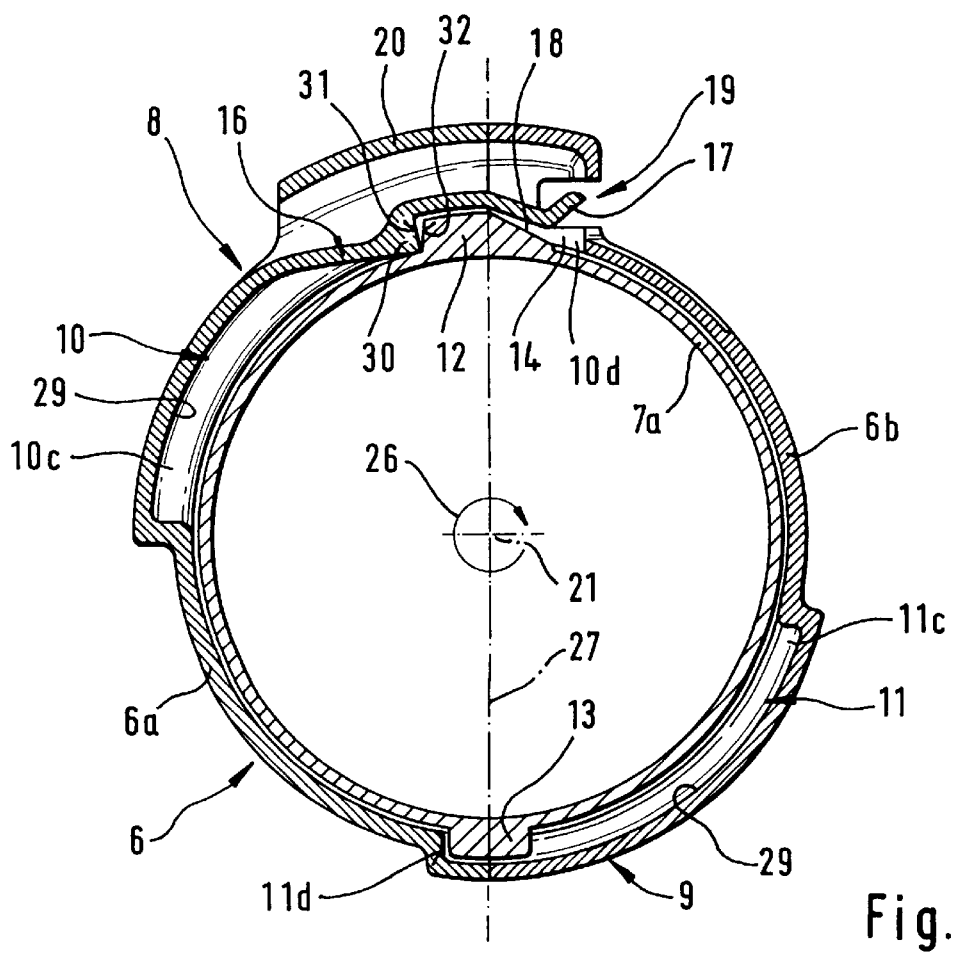
FIG. 3 is a section view taken along line III—III of FIG. 2.
Figure 4:
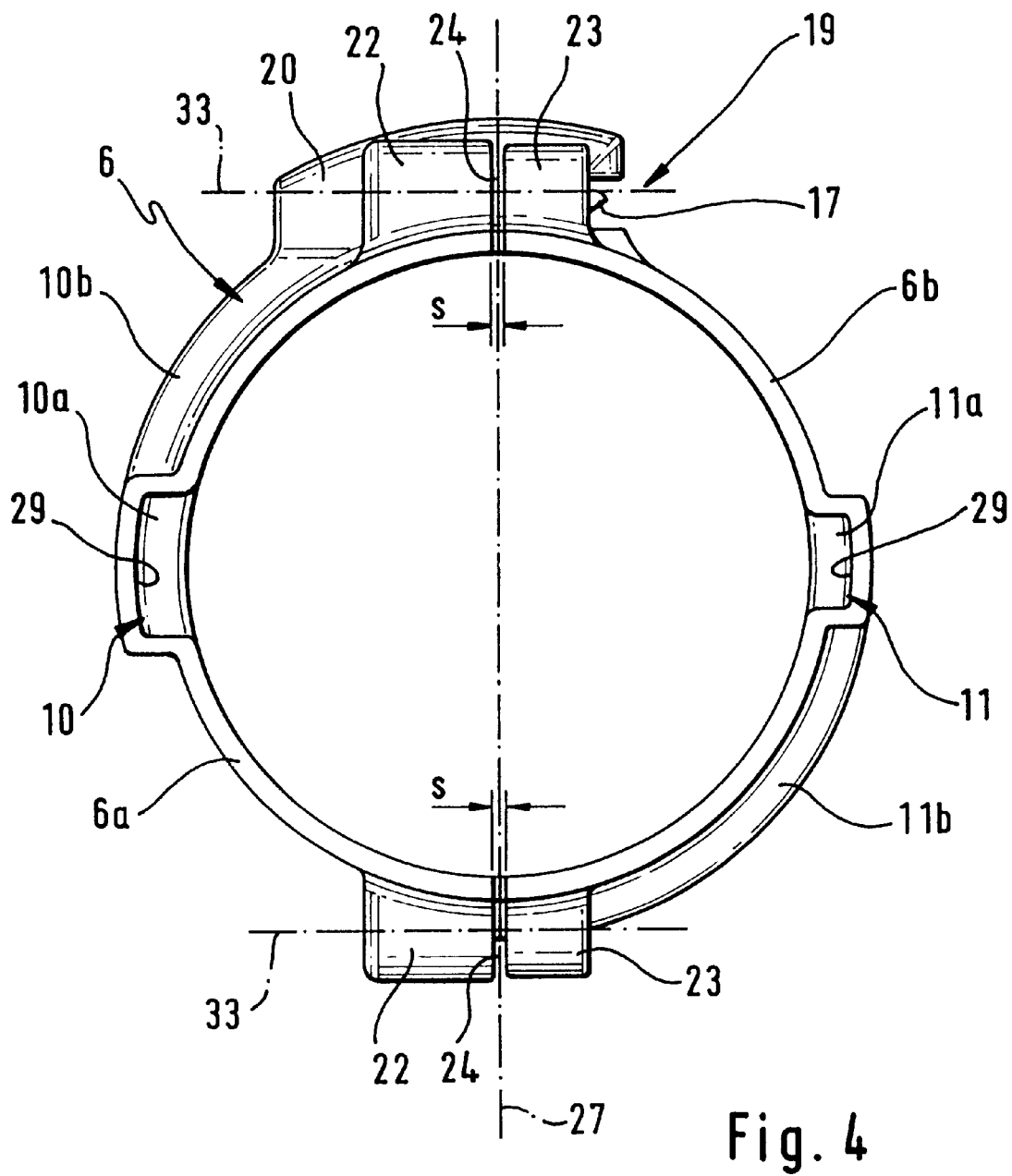
FIG. 4 is a view of the open end of the connecting stub taken along line IV—IV of FIG. 2.

The connecting tube 7 is secured in the connecting stub 6 by at least one bayonet connection 8. In the embodiment shown, two bayonet connections 8 and 9 are provided in the overlap region 41 as shown in FIG. 3. The bayonet connections (8, 9) lie approximately diametrically opposite each other referred to the longitudinal center axis 21 of the connecting stub 6. The guide paths (10, 11) of the respective bayonet connections (8, 9) are configured as channels in the wall of the connecting stub 6. The channels have a U-shape when viewed in cross section and have open sides which face toward the interior of the stub.

Each guide path (10, 11) includes a first axial segment (10a, 11a) extending approximately parallel to the longitudinal center axis 21. Each of the guide paths (10, 11) is open at its end at the end 28 of the connecting stub 6. Each of the axial segments (10a, 11a) extends via a transition segment (10b, 11b) into a peripheral segment (10c, 11c) which lies essentially at right angles to the longitudinal center axis 21. Each of the transition segments (10b, 11b) is shaped so as to correspond to a quarter circle and the ends (10d, 11d) in the peripheral direction lie offset by approximately 90° to the open end of the axial segments (10a, 11a).

As shown in FIG. 1, the transition segment 10b is configured in the mid section thereof to have a larger width b than the connecting axial segment 10a or the peripheral segment 10c. This is determined by the form of the latch cam 12 which engages in the guide path 10. The latch cam 12 has another configuration or form when viewed in plan than the cam 13 which engages in the other guide path 11. In the embodiment shown, the cam 12 is rectangular when viewed in plan and the cam 13 is circularly shaped when viewed in plan and the cams have widths which are different in the peripheral direction of the stub 6. The guide paths (10, 11) are configured so as to be adapted to the widths of the cams (12, 13) so that the connecting tube 7 can be seated in the stub 6 in only one rotational position.

The rectangularly-shaped cam 12 is held form-tight by a latch connection 15 in the peripheral segment 10c of the guide path 10. The latch connection 15 includes a latch tongue 16 which coacts with the radial, rectangularly-shaped cam 12 and extends preferably in the peripheral direction of the connecting stub 6 as shown in FIG. 3. The latch tongue can also extend in the axial direction.

In the embodiment shown, the latch tongue 16 is configured in a window 14 formed in the surface of the connecting stub 6. The free end 17 of the latch tongue 16 lies approximately at the elevation of the closed end 10d of the peripheral segment 10c. As shown in FIG. 3, the latch tongue 16 lies approximately tangential to the outer diameter of the inserted tube section 7a of the connecting tube 7. The latch tongue 16 is preferably formed from the channel base 29 of the guide path 10, that is, of the peripheral segment 10c and has a radially projecting latch lip 30. The latch lip 30 has an approximately radially disposed support surface 31 which faces toward the closed end 10d of the guide path 10.

The latch cam 12 operates together with the latch tongue 16, that is, its latch lip 30. In the embodiment shown, the latch cam 12 is configured so as to be rectangular and includes a ramp 18 which leads in the assembly rotational direction 26 and falls off in this direction. The ramp 18 has a slope angle of preferably approximately 25°.

To mount the connecting tube 7, the latter is inserted into the connecting stub 6 with the assembly end in the direction of arrow 25. The latch cams (12, 13) of different size and configuration and the correspondingly configured guide paths (10, 11) permit an insertion of the connecting tube 7 in the direction of arrow 25 in only one correct position. When the cams (12, 13) enter into the respective transition segments (10b, 11b), the user is compelled to make a rotational movement because of the arc-shaped form of the transition segments (10b, 11b). To complete assembly of the connecting tube 7, the user must rotate the tube 7 in the assembly rotational direction 26 (clockwise direction) until the latch connection 15 latches. The ramp 18, which slides onto the latch tongue 16, displaces the latch lip 30 out of the peripheral segment 10c until the latch cam 12 is moved through in the assembly rotational direction 26 under the latch lip 30 and the latter snaps back into the latch position shown in FIG. 3 because of the spring action of the latch tongue 16. The latch tongue 16 is configured as one piece with the connecting stub 6.

The ramp 18 is prevented from engaging under the closed end 10d of the guide path 10. This is achieved in that the matching is so made that, when the latch cam 13 comes into abutting contact at the end 11d in the guide path 11 of the other bayonet connection 9, the ramp 18 has a residual spacing to the closed end 10d of the guide path 10. The abutting surface 32 facing toward the latch lip 30 lies in the latched position at least in the foot region of the latch cam 12 against the support surface 31 of the latch lip 30. Preferably, the abutting surface 32 and the support surface 31 extend at a small angle to each other. This angle opens outwardly in the radial direction. This ensures that the latch lip drops behind the latch cam 12 over a certain rotational angular region. Before the guide cam 13 of the bayonet connection 9 arrives at the end 11d of the guide path 11, the latch lip already drops in rotational direction 26 behind the latch cam 12. This ensures a reliable latching even when there is a hasty assembly.

The latch tongue 16 is covered essentially over its length measured in the peripheral direction by a hood 20 in order to prevent an unintended loosening of the latch tongue 16 while simultaneously ensuring that an operator undertakes an exchange of the connecting tube 7 only with the apparatus 1 put down on the ground. The hood 20 has a narrow access window 19 only in the region of the free end 17 of the latch tongue. The access opening permits a tool such as a screwdriver or the like to be inserted for lifting the latch tongue 16 and the latch lip 30.

The distance of the hood 20 to the latch tongue 16 is so dimensioned that a reliable unlatching is ensured and an overstressing of the latch tongue is precluded because of abutting contact against the hood 20. To facilitate use by the operator, the free end 17 of the latch tongue 16 is angled in the direction toward the window 19. It can be advantageous to impress a set-off arrow 34 in the surface of the connecting stub 6 to optically emphasize the access opening 19.

Figure 2:
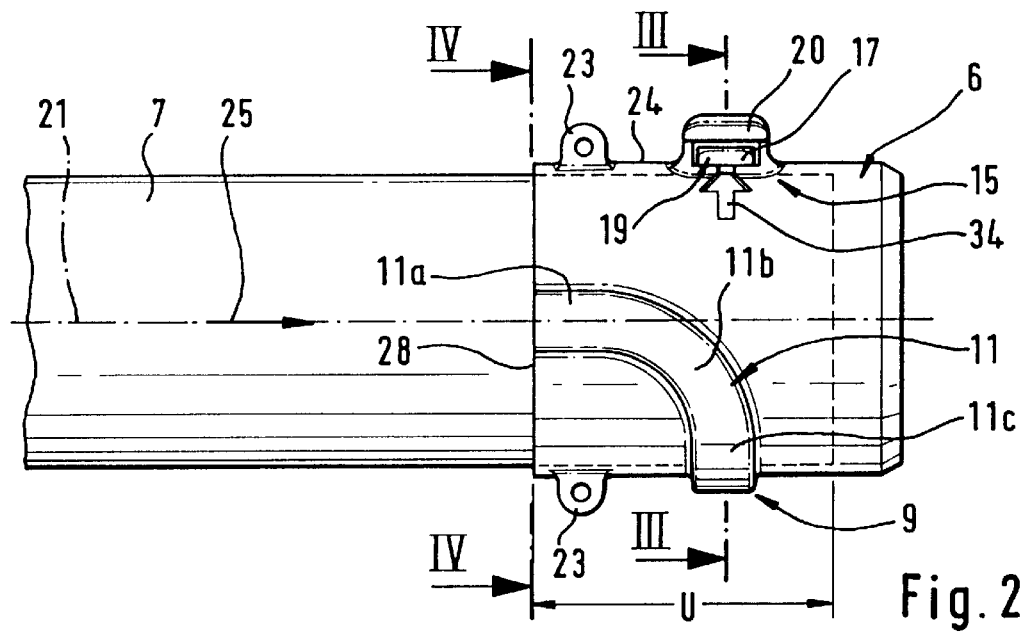
FIG. 2 is an enlarged view of the side of the connecting stub facing away from the side shown in FIG. 1 and with a blower tube mounted thereon.

The connecting stub 6 is assembled of two half shells (6a, 6b) as shown in FIG. 3. The two half shells (6a, 6b) delimit a slot 24 open toward the connecting end 28 and disposed in the partition plane 27. The slot 24 extends approximately over the length U of the overlap region 41 as shown in FIG. 2.

In the embodiment shown, slots 24 are disposed diametrically opposite to each other and have a width(s) of 2 to 5 mm. Attachment lugs (22, 23) are provided at the open ends of the slots 24 at opposite-lying longitudinal edges. Clamping screws 33 are threadably engaged in the attachment lugs (22, 23) and extend transversely to the slot 24. The connecting stub 6 can be configured so as to have a slight oversize compared to the outer diameter of the connecting tube 7. In this way, and after seating the connecting tube 7, a dimensionally correct adaptation to the outer diameter of the inserted tube section 7a is provided when tightening the clamping screws 33. This ensures, on the one hand, an easy insertion and, on the other hand, a low play attachment in the connecting stub 6.

It is understood that the foregoing description is that of the preferred embodiments of the invention and that various changes and modifications may be made thereto without departing from the spirit and scope of the invention as defined in the appended claims.

What is claimed is:

1. A portable handheld blower/vacuum apparatus comprising a drive motor and a fan wheel driven by said drive motor:

a housing for accommodating said motor and said fan wheel;

said housing including a fan scroll and having an air inlet for conducting air to said fan scroll and an air outlet for directing air out of said fan scroll;

an extension tube;

said housing further including a mounting stub fixed thereto;

said mounting stub defining a longitudinal axis and communicating with said air outlet;

a bayonet connection for facilitating the connection and disconnection of said extension tube to said mounting stub;

said mounting stub and said extension tube conjointly defining an overlap region wherein said mounting stub and said extension tube mutually engagingly overlap when said extension tube is connected to said mounting stub and said overlap region having a predetermined axial length (U);

said bayonet connection being disposed in said overlap region for axially securing said extension tube on said mounting stub;

said bayonet connection including a guide path in said overlap region on one of said mounting stub and said extension tube;

said guide path including an axial segment and a peripheral segment connected to said axial segment;

said bayonet connection further including: a radial cam on the other one of said mounting stub and said extension tube for slidingly engaging said guide path when said mounting stub and said extension tube are connected to each other; and, a locking latch device which form-tightly latches said radial cam in said peripheral segment;

said latch device including a latch tongue on said one of said mounting stub and said extension tube for contacting with said radial cam; and, said one of said mounting stub and said extension tube having a window formed in the wall thereof and said latch tongue being disposed in said window and extending in the peripheral direction of said one of said mounting stub and said extension tube.

2. The portable handheld blower/vacuum apparatus of claim 1, said one of said mounting stub and said extension tube being said mounting stub and said other one of said mounting stub and said extension tube being said extension tube; and, said extension tube having an end section inserted into said mounting stub to define said overlap region.

3. The portable handheld blower/vacuum apparatus of claim 2, said latch tongue being configured as one piece with said mounting stub.

4. The portable handheld blower/vacuum apparatus of claim 3, said peripheral segment of said guide path having an end in said mounting stub; and, said latch tongue having a free end which lies approximately at the elevation of said end of said peripheral segment.

5. The portable handheld blower/vacuum apparatus of claim 4, said latch tongue extending approximately tangential to the outer diameter of the inserted end section of said extension tube.

6. The portable handheld blower/vacuum apparatus of claim 5, said latch tongue having an approximately radially extending contact surface facing toward said cam when said extension tube is connected into said mounting stub.

7. The portable handheld blower/vacuum apparatus of claim 6, said guide path being configured as a U-shaped channel when viewed in section and said U-shaped channel having a base wall and said latch tongue being disposed in said base wall.

8. The portable handheld blower/vacuum apparatus of claim 7, said cam being capable of being moved axially along said axial segment when said extension tube is inserted into said mounting stub and said extension tube then being rotated about said axis with said cam being moved peripherally along said peripheral segment where said cam coacts with said latch tongue to latch said bayonet connection; and, said tongue having a leading falling ramp having a slope angle.

9. The portable handheld blower/vacuum apparatus of claim 8, said slope angle being approximately 25°.

10. The portable handheld blower/vacuum apparatus of claim 8, said latch tongue having an outer end; said mounting stub having a hood arranged thereon covering said latch tongue over essentially its entire length measured in the peripheral direction; and, said hood having a narrow access opening in the region of said outer end to facilitate access to said latch tongue with a tool for lifting said latch tongue to unlatch said bayonet connection.

11. The portable handheld blower/vacuum apparatus of claim 10, said outer end of said latch tongue being bent at an angle in a direction toward said access opening.

12. The portable handheld blower/vacuum apparatus of claim 2, said cam being a first cam formed on said end section of said extension tube and said guide path being a first guide path and said bayonet connection including: a second guide path on said mounting stub arranged approximately diametrically opposite said first guide path; a second radial cam formed on said end section for coacting with said second guide path; and, said first and second radial cams having respectively different sizes and/or configurations.

13. The portable handheld blower/vacuum apparatus of claim 2, one of said radial cams having a rectangular configuration when viewed in plan and the other one of said radial cams having a circular configuration when viewed in plan.

14. The portable handheld blower/vacuum apparatus of claim 2, said guide path having a transition segment for interconnecting said axial segment with said peripheral segment; and, said transition segment having a width over at least a portion thereof which is greater than the width of said axial segment.

15. The portable handheld blower/vacuum apparatus of claim 2, said mounting stub having an outer end face and including two half shells conjointly defining a partition plane; said half shells further conjointly delimiting a slot at said partition plane open at said outer end face; and, said apparatus further comprising: attachment lugs disposed on respective sides of said slot; and, attachment screws arranged transversely to said slot and coacting with said attachment lugs to clamp said half shells together.

* * * * *

UNITED STATES PATENT AND TRADEMARK OFFICE
CERTIFICATE OF CORRECTION

PATENT NO. : 6,108,865
DATED : August 29, 2000
INVENTOR(S) : Norbert Vesser, Thommas Schweigert, Joseph Karner, Helmut Hiltwein and Peter Bauer It is certified that error appears in the above-identified patent and that said Letters Patent is hereby corrected as shown below:

In column 2, line 17: delete "contacting" and substitute -- coacting -- therefor.

In column 2, line 48: delete "contacting" and substitute -- coacting -- therefor.

In column 6, line 50: delete "con-" and substitute -- co- -- therefor.

In column 6, line 51: delete "tacting" and substitute -- acting -- therefor.

Signed and Sealed this

First Day of May, 2001

Attest:

NICHOLAS P. GODICI

Attesting Officer    Acting Director of the United States Patent and Trademark Office